United States Patent [19]

Wilson

[11] 4,390,910
[45] Jun. 28, 1983

[54] PHASE-LOCK OSCILLATOR

[75] Inventor: Rosser S. Wilson, Danville, Calif.

[73] Assignee: Ball Corporation, Muncie, Ind.

[21] Appl. No.: 229,869

[22] Filed: Jan. 30, 1981

[51] Int. Cl.³ .............................................. G11B 21/10
[52] U.S. Cl. ....................................... 360/77; 360/51; 360/78
[58] Field of Search ........................ 360/77, 76, 70, 51, 360/53

[56] References Cited

U.S. PATENT DOCUMENTS

| | | | |
|---|---|---|---|
| 3,534,344 | 10/1970 | Santana | 360/77 |
| 3,887,942 | 6/1975 | Horowitz | 360/51 |
| 4,068,269 | 1/1978 | Commander et al. | 360/78 |
| 4,214,279 | 7/1980 | Oswald | 360/51 |

Primary Examiner—John H. Wolff
Attorney, Agent, or Firm—Fliesler, Dubb, Meyer & Lovejoy

[57] ABSTRACT

A phase-lock oscillator for use in conjunction with a rotatable servo surface having a servo encoding scheme of timing information and position-indicating-information, including a VCO, a phase-frequency detector, responsive to two input signals, for generating a phase and frequency error signal to control the output frequency signal of the VCO, and a control circuit for generating the two input signals in response to the timing information and output frequency signal, the control circuit being substantially digital and having passive delay lines of short delay and having a lock detector to indicate acquisition or loss of synchronization of the phase-lock oscillator with the timing information.

25 Claims, 28 Drawing Figures

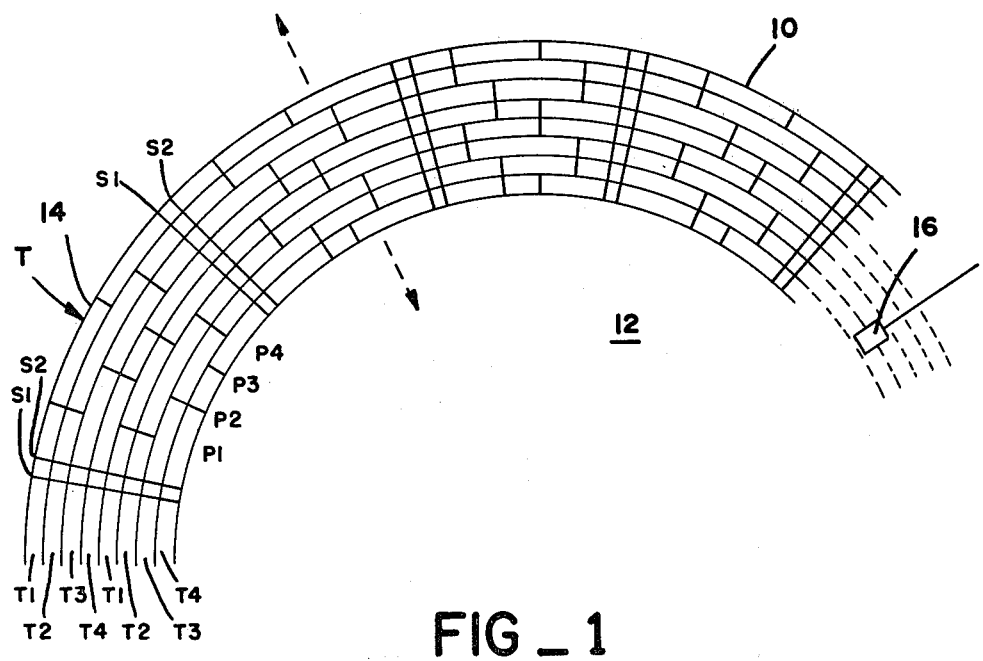
FIG _ 1
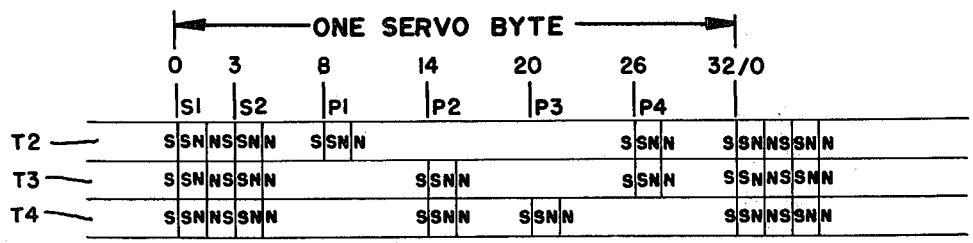
FIG _ 2A
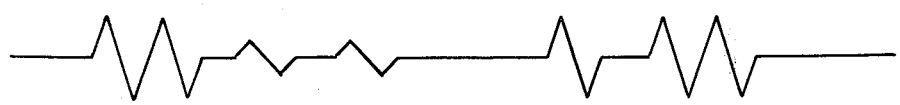
FIG _ 2B
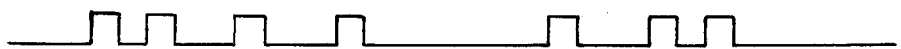
FIG _ 2C

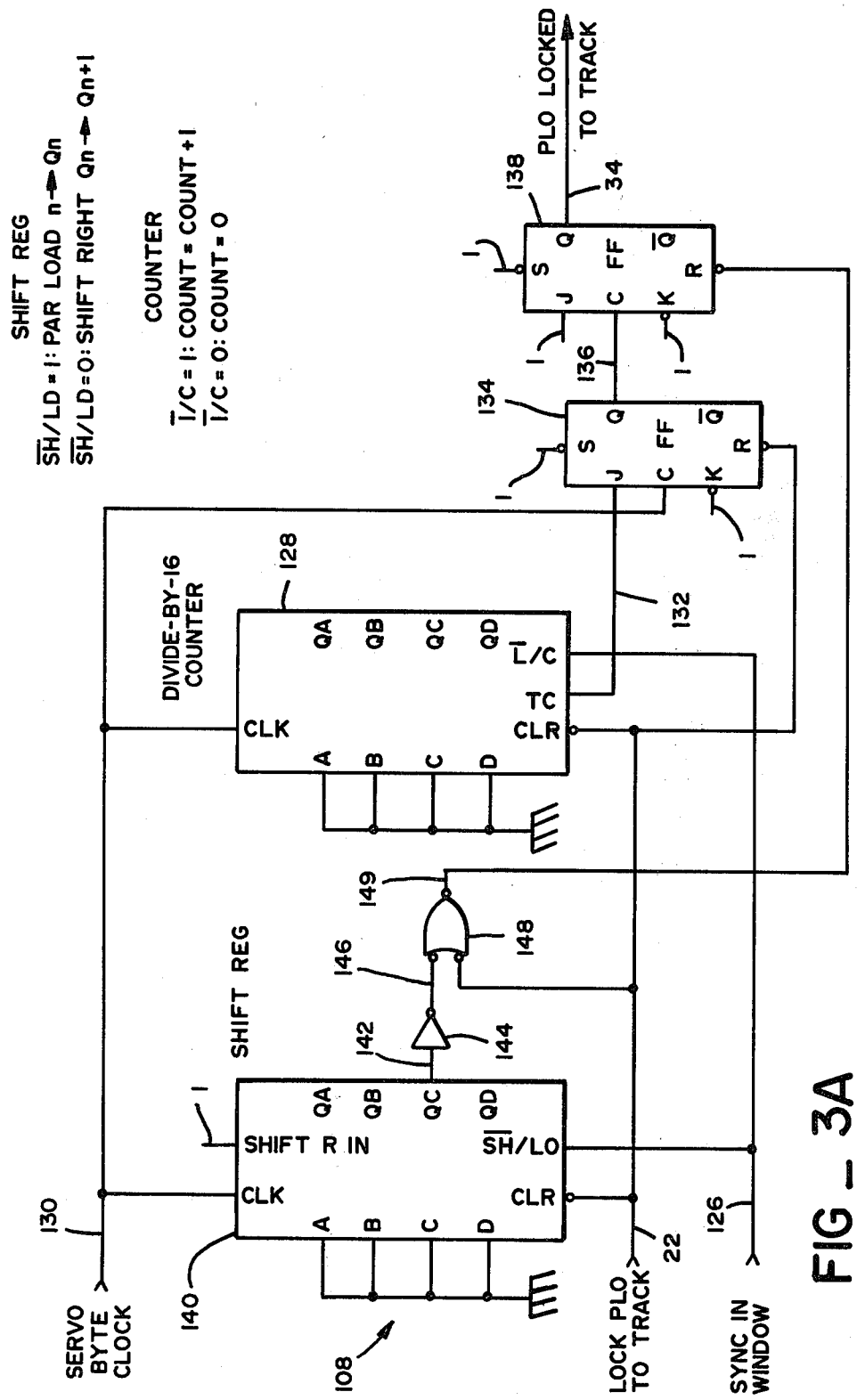
FIG._3A

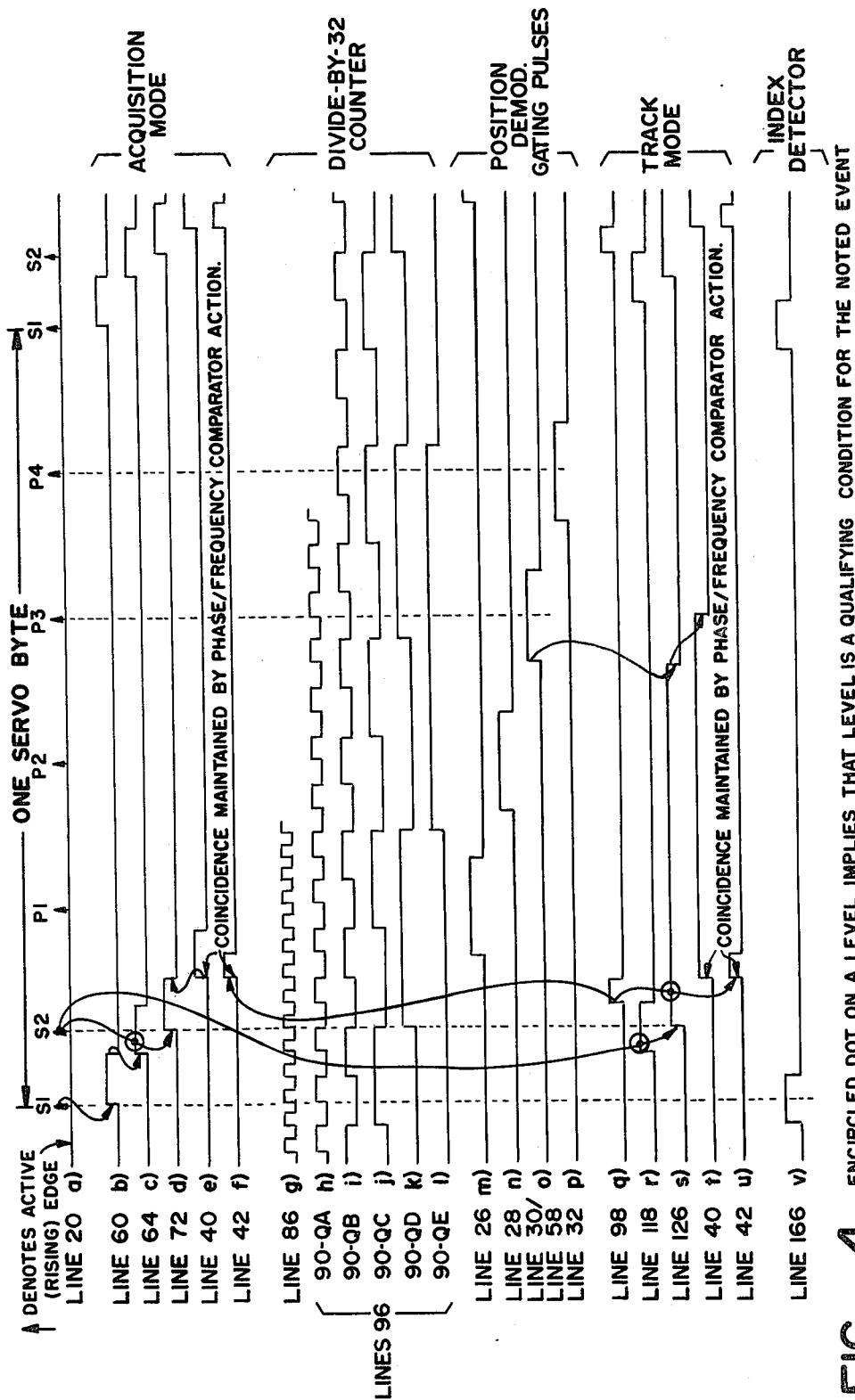
FIG—4

PHASE-LOCK OSCILLATOR

TECHNICAL FIELD

This invention relates to phase-lock oscillators and, more particularly, to phase-lock oscillators used in servo systems of storage apparatus such as track-following disk files.

BACKGROUND ART

One type of data storage apparatus is a track-following disk file which has a stack of data recording disks mounted for rotation on a central spindle. A plurality of recording heads are moved in unison in relation to respective disk surfaces to, for example, write data on concentric data tracks. Another servo head is moved in unison with the recording heads in relation to another disk surface which stores on concentric tracks a servo data encoding scheme having timing information and position-indicating-information interposed between the timing information.

A servo system of the disk file typically has a phase-lock oscillator for generating various control signals. The phase-lock oscillator responds to the timing information transduced by the servo head to generate a write clocking frequency signal used to write data on the data tracks with the recording heads. The phase-lock oscillator also responds to the timing information to generate gating signals which are "windows" for detecting and demodulating the position-indicating-information read by the servo head to center the recording heads in relation to the data tracks.

Generally, a phase-lock oscillator has a voltage controlled oscillator (VCO) which generates the write clocking frequency signal and a phase detector which generates an error signal used to control the VCO. The phase detector produces the error signal in response to any phase difference between the edges of two input signals. The phase-lock oscillator has a control circuit which generates the two input signals, one being derived from the frequency signal generated by the VCO and the other being derived from the timing information of the servo encoding scheme. When, for example, an edge of one input signal is in phase with the corresponding edge of the other input signal, the frequency signal is accurately synchronized with the timing information. Consequently, data can be written at accurate positions on the data tracks and properly timed gating signals can be generated from the synchronized frequency signal to detect and demodulate the position-indicating-information. In particular, and as an example, the control circuit can include a long-time-constant monostable element which responds to the timing information by generating a pulse, i.e., the one input signal, whose trailing edge is compared to the rising edge of the other input signal. For example, this pulse may have a duration of 600 nanoseconds.

One problem with certain prior implementations of phase-lock oscillators is that a long-time-constant monostable element of the control circuit has the disadvantges of noise sensitivity, temperature drift, and ill-defined initial delay. Noise sensitivity means that the monostable element can be triggered by circuit or line noise, temperature drift means that the pulse duration can vary in dependence on temperature, and ill-defined initial delay means that the generation of the pulse can occur at varying delays, all of which affect the timing or phase of the above-mentioned trailing edge. While control circuits employing such a long-time-constant monostable element can be pre-adjusted to overcome these component tolerances such as drift and initial delay, this adjustment itself is undesireable and imprecise. Furthermore, after adjustment, the control circuit can still exhibit unwanted sensitivity to power-supply variation and noise. Also, some control circuits do use relatively short-time-constant monostable elements which reduce the problems of drift and initial delay, but these are highly complex timing components which require pre-adjustment.

Also, in prior phase-lock oscillators, a relatively long duration "window" is provided during which the phase-lock oscillator is waiting for the timing information as the disk servo surface rotates. Defects manifesting themselves as noise pulses can appear anywhere on the servo surface. Consequently, the longer the duration of the "window", the greater the likelihood that a defect will appear to falsely trigger the control circuit.

Other implementations of phase-lock oscillators are predominantly analogue. These do not have the advantages of a substantially digital construction that generally exists for digital circuits over analog circuits.

In addition, detection of loss of synchronization to the servo timing information is essential since, upon loss, the gating signals cannot be generated at accurate times to detect and demodulate the position-indicating-information. Prior servo systems employ special circuits auxiliary to the phase-lock oscillator which, therefore, add significantly to the cost and complexity of the overall servo system.

SUMMARY OF THE INVENTION

It is an object of the present invention to provide a phase-lock oscillator which does not require preadjustment to account for control circuit design tolerances.

Another object of the present invention is to provide a phase-lock oscillator which is relatively simple and substantially free of noise sensitivity, temperature drift and initial delay.

Yet another object of the present invention is to provide a substantially digital phase-lock oscillator.

Still another object of the present invention is to provide a relatively simple and inexpensive way of detecting loss of synchronization of the phase-lock oscillator.

These and other objects of the present invention are achieved by the employment of a phase-lock oscillator for use in conjunction with a movable servo surface having an encoding scheme which includes timing information and position-indicating-information, which includes: means, responsive to an error signal, for generating a write clocking frequency signal; means, responsive to first and second input signals, for generating the error signal; means for acquiring initial synchronization including means, responsive to the timing information, for generating the first input signal, and means, responsive to the write clocking frequency signal, for generating the second input signal; means for tracking the acquired synchronization including means, responsive to the timing information occurring within a narrow interval straddling the expected time of arrival of timing information, and to the write clocking frequency signal, for generating the first input signal in phase coherence with the timing information, and means, responsive to the timing information and write clocking frequency signal, for generating the second input signal in phase coherence with the write clocking frequency signal and in frequency coherence with the timing information; and means for generating gating pulses in response to the write clocking frequency signal to demodulate the position-indicating-information.

In general, the phase-lock oscillator operates first to acquire initial synchronization with the timing information, whereupon a transition period is entered which leads into the tracking feature. The means for acquiring and means for tracking are implemented with digital elements and passive delay lines of short delay, and the tracking occurs only within a narrow interval straddling the expected time of arrival of the timing information. These and other aspects of the phase-lock oscillator will be described in more detail.

BRIEF DESCRIPTION OF THE DRAWINGS

FIG. 1 illustrates a disk servo surface of a disk file storing one example of a servo-encoding scheme.

FIG. 2A shows details of a portion of the disk servo surface of FIG. 1.

FIG. 2B and FIG. 2C illustrate waveforms used to explain the present invention.

FIG. 3A illustrates a lock detector of the phase-lock oscillator.

FIGS. 4a–4v are timing diagrams used for explaining the phase-lock oscillator.

DETAILED DESCRIPTION OF THE INVENTION

Figure 3:
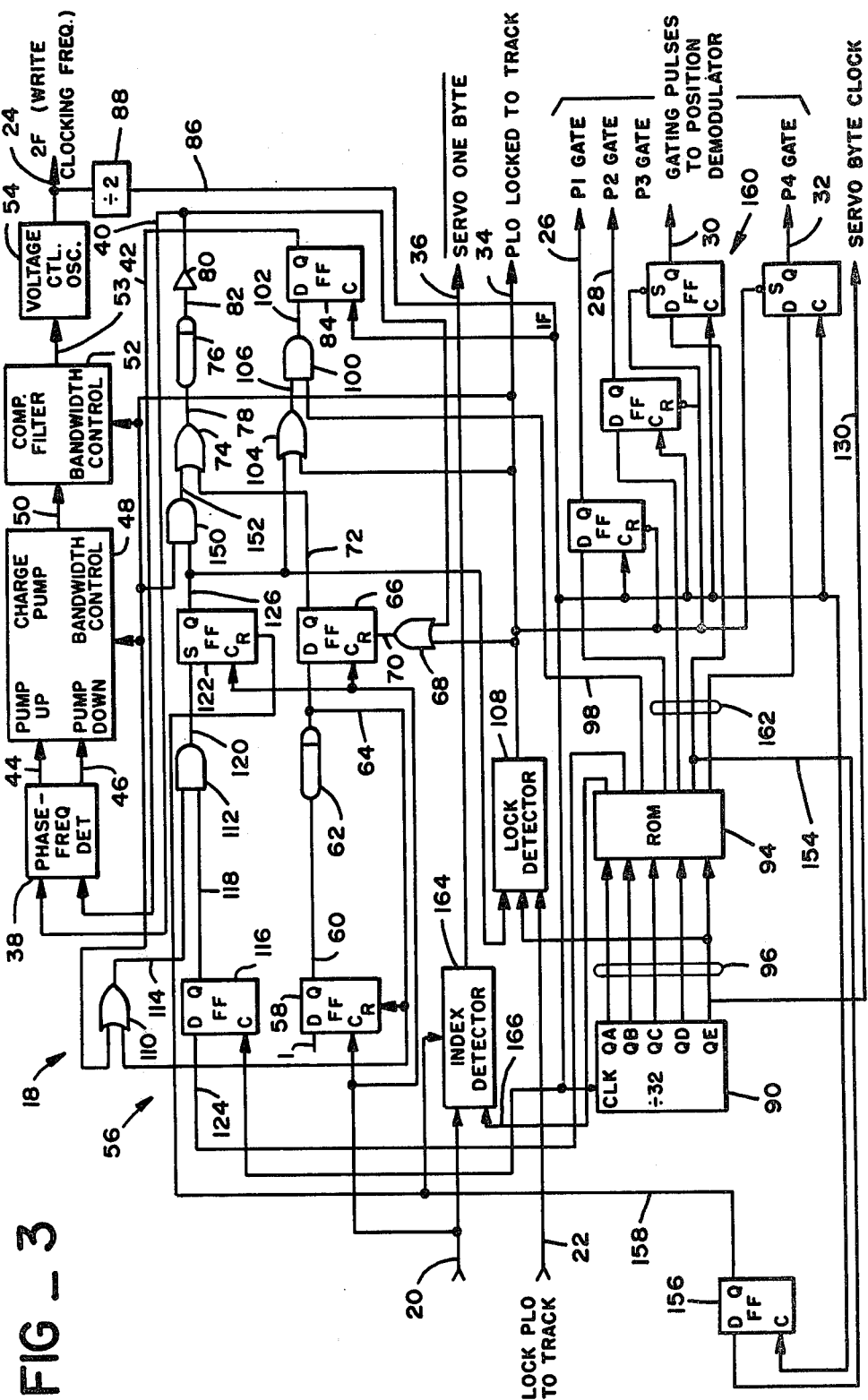
FIG. 3 shows, schematically, the phase-lock oscillator of the present invention.

The phase-lock oscillator of the present invention will be described in conjunction with one particular data storage apparatus known as a servo-track-following disk file. The phase-lock oscillator also will be described in conjunction with one known servo encoding scheme stored on a disk servo surface. However, it will become appreciated that the phase-lock oscillator can be used in conjunction with other data storage apparatus and with other well-known servo encoding schemes.

FIG. 1 illustrates one side of a rotatable disk 10 having a servo surface 12 formatted with an array of concentric tracks T. Servo surface 12 stores a servo encoding scheme shown generally at 14, which repeats every four tracks $T_1$–$T_4$.

Servo encoding scheme 14 has timing information stored in line across tracks T as pairs of synchronizing signals $S_1$ and synchronizing signals $S_2$. The interval from one synchronizing signal $S_1$ to a circumferentially adjacent synchronizing signal $S_1$ along a track T is termed a servo byte interval. This interval can be nominally 3.32 microseconds in length, there being 32 subdivisions each of 103 nanoseconds duration between the adjacent synchronizing signals $S_1$.

The servo encoding scheme 14 also includes position-indicating-information stored along tracks T as position signals $P_1$–$P_4$, as shown. Position signals $P_1$–$P_4$ are more widely spaced from each other and from a pair of adjacent synchronizing signals $S_1$, $S_2$ than adjacent synchronizing signals $S_1$, $S_2$ in the pair are spaced from one another for reasons which will be discussed below. For example, synchronizing signals $S_1$ and $S_2$ are spaced apart 3 subdivisions (309 nanoseconds), whereas position signals $P_1$–$P_4$ are spaced apart at least 5 subdivisions from each other and from adjacent synchronizing signals $S_1$, $S_2$. FIG. 1 also depicts a servo head 16 being centered over the boundary between adjacent tracks $T_2$, $T_3$. For an overview of another servo encoding scheme which may be used in conjunction with the present invention, reference may be made to a paper entitled Design of a Disk File Head-Positioning Servo, by R. K. Oswald, IBM Journal of Research and Development, November 1974, pp. 506–512.

FIG. 2A shows in more detail tracks $T_2$–$T_4$ and indicates the synchronizing signals $S_1$, $S_2$ and position signals $P_1$–$P_4$ as being encoded as dipole magnetizations. FIG. 2B shows the idealized voltage signal that is induced in the coil of the servo head 16 when the head 16 is centered over the boundary between tracks $T_2$, $T_3$. FIG. 2C illustrates a squared version of the voltage signal of FIG. 2B which is obtained with conventional components (not shown).

FIG. 3 shows a phase-lock oscillator (PLO) 18 which receives on an input line 20 the squared version as shown at FIG. 2C of synchronizing signals $S_1$, $S_2$ and position signals $P_1$–$P_4$. Phase-lock oscillator 18 also receives on an input line 22 a control signal from, for example, a microprocessor (not shown) of the disk file and which is asserted when the disk spindle (not shown) is at rated speed. Phase-lock oscillator 18 generates a write clocking frequency signal of frequency 2F on an output line 24 and which is used by data encoding circuits (not shown) to write data on data storage disks (not shown). Phase-lock oscillator 18 also has four output lines 26, 28, 30, 32 carrying gating signals for gating the position signals $P_1$–$P_4$ respectively to a position demodulating circuit (not shown) to demodulate this position-indicating-information for well-known reasons. Another output line 34 of phase-lock oscillator 18 carries a "PLO locked-to-track" signal indicating when synchronization between the phase-lock oscillator 18 and the timing information, particularly synchronizing signal $S_2$, has been achieved, or when synchronization has been lost. Yet another output line 36 carries a signal indicating servo byte intervals in which synchronizing signals $S_1$ may be omitted for reasons to be described.

Phase-lock oscillator 18 operates in two mutually exclusive modes. One is termed an "unlocked" or "acquisition" mode during which initial synchronization between the phase-lock oscillator 18 and the synchronizing signal $S_2$ of the timing information is acquired. The other is termed the "locked" or "tracking" mode during which the circuit tracks or locks in the acquired synchronization. Phase-lock oscillator 18 also has a transition mode which governs the transition between the acquisition mode and the tracking mode. The circuit portion of phase-lock oscillator 18 for the initial synchronization acquisition mode will be described followed by a description of the circuit portion for the transition mode and then the tracking mode. Reference also will be made to the timing diagram of FIGS. 4a–4v. In the synchronization acquisition mode, the "PLO locked-to-track" signal on line 34 is low, whereas in the tracking mode this signal is high.

PHASE-LOCK OSCILLATOR-ACQUISITION MODE

Phase-lock oscillator 18 includes a phase-frequency detector 38 which can be, for example, the Motorola type 12040 integrated circuit, and which receives an input signal on a line 40 and an input signal on a line 42. Detector 38, in a conventional manner, produces a "pump-up" error signal on an output line 44 or a "pump-down" error signal on an output line 46 depending on the relative phase and frequency between the two input signals on lines 40, 42. A standard charge pump 48 responds to the signals on lines 44, 46 by producing an error signal on an output line 50 which is proportional to the difference in phase and frequency between the two input signals on lines 40, 42. A compensator filter 52 filters the error signal on line 50 to control loop dynamics and to produce a filtered error signal on a lines 53 which controls the variable output frequency 2F of a voltage controlled oscillator (VCO) 54 on output line 24. Charge pump 48 and compensator filter 52 have their gain and bandwidth increased under influence of a low signal on line 34 to facilitate rapid acquisition of synchronization of the phase-lock oscillator 18. The remainder of phase-lock oscillator 18 is a substantially digital control circuit 56 that produces the two input signals on lines 40, 42.

A rising edge-triggered D-type flip-flop 58 has a clock or trigger input connected to the line 20 carrying the signals shown in FIG. 2C. FIG. 4a illustrates the leading or rising edges of these signals on line 20, which causes flip-flop 58 to produce a short duration pulse of about 200 nanoseconds duration on an output line 60, as shown in FIG. 4b. A delay line 62 delays the pulse on line 62 by about 200 nanoseconds to produce a delayed pulse on a line 64, as shown in FIG. 4c. The pulse on line 64 is passed to subsequent circuitry and also feeds back as a d-c reset to flip-flop 58. Thus, flip-flop 58 and delay line 62 combine to produce a pulse on line 64 of 200 nanoseconds in duration occurring every 200 nanoseconds subsequent to a rising edge on line 20.

An edge-triggered D-type flip-flop 66 has its data input coupled to the line 64 and its clock input coupled to the line 20. Flip-flop 66 has its d-c reset input coupled to the output of an Or gate 68 over a line 70, with one input of gate 68 being coupled to line 34 and the other input being coupled to line 40. Since the "PLO locked-to-track" signal on line 34 is low during the synchronization acquisition mode, it does not hold flip-flop 66 reset via gate 68. As shown in FIG. 4a, and as already mentioned, synchronizing signal $S_2$ occurs nominally 300 nanoseconds after synchronizing signal $S_1$, and position signals $P_1$-$P_4$ are spaced at considerably wider intervals of at least 500 nanoseconds along a given track T.

Therefore, only when flip-flop 66 is clocked by signal $S_2$, is there a signal on line 64 that is switched to the output Q on a line 72 coincident with the rising edge of $S_2$, as shown in FIG. 4d.

An Or gate 74 has one input coupled to line 72 and an output coupled to a delay line 76 over a line 78. A Schmitt trigger 80 is connected to the output of delay 76 over a line 82 and has its output connected to line 40. Delay line 76 produces a delay of about 200 nanoseconds duration. Consequently, the output of flip-flop 66 is coupled through gate 74, delayed 200 nanoseconds by delay line 76 and squared by Schmitt trigger 80, as shown in FIG. 4e, to become one of the input signals to phase-frequency detector 38 on line 40. This signal on line 40 also is gated through gate 68 to reset flip-flop 66 in anticipation of generating the next output on line 72 coincident with the next synchronizing signal $S_2$.

The other input signal, shown in FIG. 4f., to phase-frequency detector 38 on line 42 is connected to the output Q of an edge-triggered D-type flip-flop 84, which has a clock input connected to a line 86. A divide-by-two divider 88 divides the write clocking frequency signal 2F on line 24 from VCO 54 to produce a clock frequency signal 1F on line 86, as shown in FIG. 4g, to clock flip-flop 84. A counter 90 is clocked by the frequency signal 1F on line 86 and divides the signal 1F by 32 to produce counter state outputs $Q_A$-$Q_E$, as shown in FIGS. 4h-4l, respectively. A read only memory (ROM) 92 is addressed by the counter state outputs $Q_A$-$Q_E$ over lines 96 to produce a pulse on an output line 98 once every 64 cycles of the frequency signal 2F. This pulse is shown in FIG. 4q.

An AND gate 100 has its output coupled to the data input of flip-flop 84 over a line 102, and has one input coupled to line 98 and another input coupled to the output of an Or gate 104 over a line 106. Gate 104 has an active low input coupled to line 34. Therefore, during this synchronization acquisition mode the low on line 34 results in a high on line 106 to enable gate 100 which gates the pulse on line 98 to the data input of flip-flop 84. When flip-flop 84 is then clocked by the signal 1F on line 86, the output Q, or other input signal on line 42, to phase-frequency detector 38 is generated.

FIG. 4e and FIG. 4f illustrate the rising edges of the signals on lines 40, 42 as being in phase. When this occurs, the write clocking frequency signal 2F on line 24 and the demodulator gating signals on lines 26, 28, 30 and 32 are synchronized to the timing information of the servo encoding scheme 14.

In the overall start-up operation of phase-lock oscillator 18 during the synchronization acquisition mode, as servo surface 12 rotates in relation to servo head 16, the pulses corresponding to the timing information of synchronizing signals $S_1$, $S_2$ and position-indicating-information $P_1$-$P_4$ appear on line 20. The pulses $S_1$, $S_2$ corresponding to the timing information cause pulses related to the time of occurrence of synchronizing signal $S_2$ to appear on input line 40 of phase-frequency detector 38. During this start-up time, the VCO 54 also is producing a write clocking frequency signal which is in the general range of 64 times the occurrence rate of the signals appearing on line 40, resulting in the generation of the other input signal on line 42. As long as the two input signals to phase-frequency detector 38 are out-of-phase and frequency, the error signal on line 53 will be generated to control the VCO 54 to vary the frequency of the write clocking frequency signal 2F in such direction as to bring the signals on line 40 and line 42 into frequency and phase coherence. Ultimately, and as will be further described, the two input signals on lines 40, 42 will be in phase, which means that the write clocking frequency signal 2F will be synchronized to the timing information on servo surface 12.

PHASE-LOCK OSCILLATOR-TRANSITION FROM SYNCHRONIZATION ACQUISITION MODE TO TRACKING MODE

Phase-lock oscillator 18 has a synchronization lock detector 108, as shown in FIG. 3, that is activated by the signal on line 22 and produces the "PLO locked-to-track" signal on line 34. When the disk file is up to speed, the microprocessor (not shown) will respond by producing a high on line 22 to activate lock detector 108. Then, as will be described below, after lock detector 108 has detected, for example, that 16 consecutive synchronizing signals $S_2$ appear in proper time relationship to the output of VCO 54, the "PLO locked-to-track" signal on line 34 will be switched from low to high.

More particularly, phase-lock oscillator 18 has an Or gate 110 having one input connected to line 34 and another input connected to the output of delay line 62 on line 64. Until the lock detector 108 has determined that lock has been achieved, the input to gate 110 on line 34 is low. Therefore, gate 110 passes the delayed pulses on line 64 which are shown in FIG. 4c and which correspond to the arrival of synchronizing signals $S_2$.

An AND gate 112 has one input connected to the output of gate 110 via a line 114 and another input coupled to the output Q of an edge-triggered D-type flip-flop 116 over a line 118. The output of gate 112 is coupled over a line 120 to an edge-triggered S-type flip-flop 122.

Flip-flop 116 is clocked at its clock input with the frequency signal 1F on line 86. Flip-flop 116 has its data input coupled to a line 124 leading from an output of ROM 94 which is generated in response to an address from counter 90. The output pulse on line 124 is 206 nanoseconds in width, which is four cycles of the frequency signal 2F. This output pulse then is clocked to the output Q of flip-flop 116 on line 118 as shown in FIG. 4r to enable AND gate 112 at a time so chosen that when phase-lock oscillator 18 has attained lock the signal on line 118 straddles the expected time of arrival of the signal $S_2$ on line 114.

Flip-flop 122, as already mentioned, receives the output of gate 112 on line 120 at its S input. Flip-flop 122 has its clock input connected to line 20 and an output Q coupled to a line 126 leading to lock detector 108.

Thus, in each servo byte interval, a "window" around the expected time of arrival of synchronizing signal $S_2$ is produced at the output of flip-flop 116 to enable gate 112 to pass the delayed pulse from delay line 62 and gate 110 to flip-flop 122. Then, at the rising edge of synchronizing signal $S_2$ on line 20 for each servo byte interval, flip-flop 122 is clocked to produce a pulse on line 126 indicating the occurrence of synchronizing signal $S_2$. This pulse on line 126 is termed a "sync in window", meaning that when a high is on line 126, the synchronizing signal $S_2$ appeared in the "window".

As shown in FIG. 3A, lock detector 108 includes a positive-edge triggered counter 128 which is rendered operative by the high signal on line 22 and is clocked by the rising edge output of counter 90 on a line 130. Each positive "sync in window" signal appearing on line 126 deactivates the negative true load input of counter 128 to allow the counter to step once. After 16 consecutive "sync in window" signals on line 126, counter 128 produces a high output on a line 132. If the "sync in window" signal does not occur in a servo byte interval, i.e., the signal on line 126 is low at the time of rise of the signal on line 130, counter 128 is cleared by parallel loading in logic 0's. Thereafter, the count continues again from zero.

A J-$\overline{\text{K}}$ flip-flop 134 has its J-input connected to the output of counter 128 on line 132, has its clock input coupled to line 130, and is rendered operative by the high signal on line 22. When 16 consecutive "sync in window" signals are generated, the high on line 132 is clocked to an output Q of flip-flop 134 on a line 136 connected to the clock input of a J-$\overline{\text{K}}$ flip-flop 138. Flip-flop 138 thus is clocked to produce a high at its output Q on the line 34, which is the "PLO locked-to-track" signal.

Once synchronization has been acquired, as indicated by the high on line 34, it is possible for the phase-lock oscillator 18 to lose synchronization. This can occur if, for example, due to defects on the servo surface 12, a number of synchronizing signals $S_2$ do not occur. Consequently, phase-lock oscillator 18 also produces the "loss-of-sync" signal on line 34 in the following manner.

Lock detector 108 has a shift register 140 which is rendered operative by the high on line 22, clocked by the rising edge of the frequency signal on line 130 and loaded under control of the "sync in window" signal on line 126. If the "sync in window" signal is high during the rising edge of the clock signal, shift register 140 is parallel loaded with logic 0's. If the "sync in window" signal is low, shift register 140 is serially loaded with a logic 1. After, for example, three consecutive servo byte intervals in which the "sync in window" signal on line 126 is low, shift register 140 will produce a high or logic 1 on an output line 142. The requirement of the loss of three consecutive "sync-in-window" signals renders the circuit tolerant of isolated defects on the servo disk surface 12.

An inverter 144 inverts the output on line 142 to produce an inverted pulse on a line 146 as one input to an Or gate 148. The other input to gate 148 is the signal on line 22. Flip-flop 138 has its reset input connected to the output of gate 148 on a line 149. Gate 148 is activated by a low on line 146 or a low on line 22.

Assume that the phase-lock oscillator 18 has acquired synchronization so that the high "PLO locked-in-track" signal on line 34 is produced. Then, if three consecutive servo byte intervals occur in which the "sync in window" signal does not appear on line 126, the output of shift register 140 on line 142 goes high and is inverted by inverter 144 to enable gate 148. The output of gate 148 then resets flip-flop 138, causing the signal on line 34 to go low, which is the "loss-of-lock" signal. The disk drive microprocessor also uses this signal as an indication of excessive flaws on the servo disk surface 12 or of a circuit failure. Also, should the signal on line 22 go low, indicating that the disk file has lost rotational speed or must be disabled, gate 148 will be enabled to reset flip-flop 138 to produce the "loss-of-lock" signal on line 34. This forces the phase-lock oscillator 18 into a continuous synchronization acquisition mode until the signal on line 22 again goes high and synchronization has been acquired.

In the overall operation of the phase-lock oscillator 18 during this transition period, as the servo surface 12 rotates, phase-lock-oscillator 18 will be acquiring synchronization. After the disk file is up to speed and after 16 consecutive servo byte intervals in which the "sync-in-window" signal is generated, the "PLO locked-to-track" signal is produced on line 34 which not only indicates this condition but, as will be discussed, switches the phase-lock oscillator 18 into the tracking mode. Thereafter, should three consecutive servo byte intervals occur without a "sync-in-window" signal, the "loss-of-sync" signal will appear on line 34 to indicate this condition and switch the phase-lock oscillator 18 back to the acquisition mode where it will remain. Thereafter, should the disk drive microprocessor wish to attempt to reestablish phase lock to the servo surface 12, it may do so by momentarily lowering the signal on line 22 to clear shift register 140 and then raising the signal on line 22. Also, after synchronization has been acquired, should the signal on line 22 go low, the "loss-of-sync" signal on line 34 will be generated to indicate this condition and to continuously maintain the phase-lock oscillator 18 in the acquisition mode until the signal on line 34 again goes high.

PHASE-LOCK OSCILLATOR-TRACKING MODE

As already mentioned, once synchronization aquisition has occurred, the "PLO locked-to-track" signal on line 34 is generated as a high level. It will be appreciated that operation of phase-frequency detector 38, charge pump 48, compensator filter 52 and VCO 54 are substantially the same as their operation in the acquisition mode, with the exception that the high level on line 34 acts on charge pump 48 and compensator filter 52 to lower their bandwidth and hence improve the noise immunity of the overall phase-lock oscillator 18.

Because of the high level on line 34, flip-flop 66 is held reset via this high being gated through Or gate 68. Therefore, since it is held reset, flip-flop 66 cannot be clocked to produce the pulse on line 72 that in acquisition mode ultimately becomes the input signal on line 40 through gate 74, delay line 76 and Schmitt trigger 80.

Also, the high on line 34 is gated through Or gate 110 to constantly enable AND gate 112. Thus, the output of delay line 62 on line 64, which corresponds to the arrival of synchronizing signal $S_2$ on line 20, has no effect in enabling gate 112. Flip-flop 116, as previously described and as shown in FIG. 4r, continues to produce the 200 nanosecond window or pulse centered around the expected time of arrival of synchronizing signal $S_2$ and this pulse is gated through gate 112 to the S input of flip-flop 122. Then, when synchronizing signal $S_2$ arrives on line 20, flip-flop 122 is clocked to produce the output Q on line 126 as shown in FIG. 4s. This ensures that flip-flop 122 is responsive to transitions on line 20 centered only around the expected time of arrival of synchronizing signal $S_2$ and considerably enhances circuit immunity in the tracking mode to noise pulses and servo surface defects since the circuit is sensitive to such phenomena for only a very small fraction of a servo byte interval. The output pulse on line 126 is then gated through an AND gate 150, which is held enabled by the high on line 34, onto an output line 152, and then through gate 74, delay line 76 and Schmitt trigger 80 to become the input signal on line 40 to phase-frequency detector 38 as shown in FIG. 4t. Thus, an input signal is produced on line 40 for every synchronizing signal $S_2$ on line 20 which falls within the above-mentioned 200 nanosecond window, and which accurately reflects the phase timing of synchronizing signal $S_2$.

ROM 94 produces an output pulse on a line 154 to the data input of an edge-triggered D-type flip-flop 156. Flip-flop 156 is clocked by the frequency signal 1F on line 86 and produces an output Q on a line 158 to reset flip-flop 122. The timing is such that flip-flop 122 is reset between occurrences of synchronizing signal $S_2$ and hence is rendered responsive to the next occurrence of synchronizing signal $S_2$.

The output Q on line 126 also is coupled through Or gate 104 to enable AND gate 100. As already mentioned, and as shown in FIG. 4q, the pulse on line 98 is generated at a time nominally 100 nanoseconds ($\frac{2}{3}$ the delay of delay line 76) subsequent to the expected time of arrival of synchronizing signal $S_2$ and is gated through to flip-flop 84. Then, frequency signal 1F clocks flip-flop 84 to produce the input signal on line 42 for another delay of about 103 nanoseconds. FIG. 4u shows the signal existing on line 42.

It can be seen that the effect of flip-flop 84 and AND gate 100 is to provide an input on line 42 to phase-frequency detector 38 which occurs once for each synchronizing signal $S_2$ occurrence detected by flip-flop 122, but which is phase-coherent with the output of VCO 54. Thus, phase-frequency detector 38 is caused to operate in a phase-sensitive-only mode and is not perturbed by any occasional momentary loss of signal $S_2$ which may result from the dropout phenomena characteristic of magnetic recording technology. This is because loss of signal $S_2$ will lead to the generation of no signal on line 40 or line 42, hence the state of phase-frequency detector 38 will remain unchanged.

In the overall operation of phase-lock oscillator 18 in the tracking mode, as the disk file rotates, and assuming there is synchronization, the input signal on line 40, as shown in FIG. 4t, and the input signal on line 42, as shown in FIG. 4u, are generated. These input signals have rising edges which are in phase and, therefore, phase-lock oscillator 18 is in synchronization.

DEMODULATOR CONTROL AND INDEX DETECTOR CIRCUITS

The phase-lock oscillator 18 also includes a demodulator control circuit comprising four flip-flops shown generally at 160 which are clocked by the frequency signal 1F on line 86 and forced to predetermined states in the acquisition mode by a low signal on line 34, as shown. This ensures that the position demodulator automatic gain control (not shown) operates at a known value during the acquisition mode. During the tracking mode, line 34 is high, thus allowing the outputs Q of flip-flops 160 to follow their D inputs. Each of the flip-flops 160 has its data input connected to a respective output of ROM 94 over four lines shown generally at 162. The outputs Q of flip-flops 160 are coupled, respectively, to lines 26, 28, 30, 32 carrying the gating pulses shown in FIGS. 4m–4p, respectively. These pulses provide control signals for demodulation of the servo position information $P_1$–$P_4$, according to well-known techniques.

Also shown in the phase-lock oscillator 18 is an index detector 164. Common practice with disk files provides a unique angular location marker which is customarily encoded on the servo surface 12 as a unique radial pattern (not shown) comprising several servo bytes from which are variously omitted the synchronizing signal $S_1$. The function of the index detector 164 is to give an indication of whether a given servo byte has signal $S_1$ deleted, hence forming part of an index pattern.

The omission of signal $S_1$ has no effect on the behavior of phase-lock oscillator 18 in tracking mode since in this mode, only signal $S_2$ provides the necessary timing datum. In acquisition mode, deletion of signal $S_1$ causes signal $S_2$ not to be detected. Lock detector 108 then is not provided with a "sync in window" signal on line 126; this causes counter 128 to be reset, and defers generation of the "PLO locked-to-track" signal on line 34 until after the index encode region has passed. Index points are coded at sufficiently wide intervals as to allow acquisition to be concluded in the intervening spacing.

Index detector 164 operates to deliver an output which persists for one servo byte interval when a servo byte is detected from which synchronizing signal $S_1$ is omitted. A line 166 from ROM 94 is timed to occur, when the phase-lock oscillator 18 is in lock, at a position straddling the expected position of signal $S_1$. Occurrence of signal $S_1$ in this interval causes a flip-flop (not shown) of index detector 164 to set and deliver a low level on line 36 indicative of the occurrence of signal $S_1$.

Index detector 164 is reset by the signal on line 158 in preparation for receipt of the next signal S₁. Line 36 feeds to a pattern decode shift register circuit (not shown) for decoding a pre-arranged sequence indicative of index position on the servo track.

SUMMARY

In addition to the advantages and features of phase-lock oscillator 18 already indicated, the present invention eliminates the use of prior analogue techniques having critical long-time determining elements (e.g. monostable elements) prone to drift, ill-defined delay and power supply sensitivity in favor of exclusive use of digital elements and passive delay lines of short delay comprising control circuit 56. This makes for a stable, adjustment-free circuit.

Prior phase-lock oscillators often use a phase-only detector which can undesirably cause lock-up on harmonics of its input signal generated from the timing information read off the surface 12. The phase-frequency detector 38 of phase-lock oscillator 18 provides the advantage of harmonic-free lock-up, as well as fast slewing to lock-on.

A previous deterrent to use of phase-frequency detectors is that momentary loss of timing information (e.g. caused by surface defects) is interpreted as a frequency change and causes a large, undesirable perturbation in VCO frequency. The present invention solves this problem by introducing the tracking mode wherein reconstruction of the phase-frequency detector input signal on line 42 is done in such a fashion as to modulate its frequency to maintain frequency coherence with timing information read from the disk, yet retain phase information indicative of VCO phase.

Prior phase-lock oscillators have no built-in lock detection logic, a feature which is useful in indicating to the using system that a fault has occurred. The present invention contains this implicitly as the means for transitioning between the fast-slew synchronization acquisition mode and the noise and dropout immune tracking mode.

Other aspects, objects and advantages of this invention can be obtained from a study of the drawing, the disclosure and the appended claims.

What is claimed is:

1. A phase-lock oscillator for use in conjunction with a movable servo surface having a servo encoding scheme which includes timing information and position-indicating-information, comprising:
    (a) means, responsive to an error signal, for generating a write clocking frequency signal;
    (b) means, responsive to first and second input signals, for generating the error signal;
    (c) means for acquiring initial synchronization including
        (i) means, responsive to the timing information, for generating the first input signal, and
        (ii) means, responsive to the write clocking frequency signal, for generating the second input signal;
    (d) means for tracking the acquired synchronization including
        (i) means, responsive to the timing information occurring within a narrow interval straddling the expected time of arrival of the timing information, and the write clocking frequency signal, for generating the first input signal in phase coherence with the timing information, and
        (ii) means, responsive to the write clocking frequency signal and timing information, for generating the second input signal in phase coherence with the write clocking frequency signal, and in frequency coherence with the timing information; and
    (e) means for generating gating pulses in response to the write clocking frequency signal to demodulate the position-indicating-information.

2. A phase-lock oscillator according to claim 1 further comprising means for generating a signal indicating the acquisition or loss of synchronization, said means for tracking being responsive to the indicating signal.

3. A phase-lock oscillator according to claim 2 wherein said means for generating the indicating signal comprises means, responsive to the timing information, for detecting a predetermined number of occurrences of the timing information to produce the synchronization acquisition indicating signal, said means for tracking being activated in response to the synchronization acquisition indicating signal.

4. A phase-lock oscillator according to claim 3 wherein said means for generating the indicating signal comprises means, responsive to the timing information, for detecting a predetermined number of occurrences of loss of the timing information to produce the loss of synchronization indicating signal, said means for tracking being deactivated in response to the loss of synchronization indicating signal.

5. A phase-lock oscillator according to claim 1 wherein said means for generating the first input signal of said means for acquiring initial synchronization comprises:
    (a) a first flip-flop having a clock input and an output and being clocked in response to the timing information;
    (b) a short delay line having an input connected to said output of said first flip-flop and an output; and
    (c) a second flip-flop having a clock input and being clocked in response to the timing information, and a data input being connected to said output of said short delay line.

6. A phase-lock oscillator according to claim 1 wherein said means for generating an error signal comprises a phase-frequency detector.

7. A phase-lock oscillator according to claim 1 wherein said means for generating gating pulses comprises:
    (a) counter means for dividing the write clocking frequency signal and for generating address signals identifying the state of said counter means; and
    (b) memory means, responsive to the address signals, for producing output signals.

8. A phase-lock oscillator according to claim 1 wherein said means for generating the first input signal of said means for acquiring initial synchronization comprises:
    (a) a first flip-flop having a clock input, a reset input, and an output, and being clocked in response to the timing information;
    (b) a first short delay line having an input coupled to said output of said first flip-flop and an output coupled to said reset input of said first flip-flop;
    (c) a second flip-flop having a clock input and being clocked in response to the timing information, a data input coupled to said output of said first short delay line, a reset input, and an output, and (d) a second short delay line having an input coupled to said output of said second flip-flop and an output coupled to said error signal generating means and to said reset input of said second flip-flop.

9. A phase-lock oscillator according to claim 1 wherein said means for generating the second input signal of said means for acquiring initial synchronization comprises:
   (a) a flip-flop having a data input, an output coupled to said error signal generating means, and a clock input coupled to said write clocking frequency signal generating means;
   (b) counter means for dividing the write clocking frequency signal and for generating address signals identifying the state of said counter means; and
   (c) memory means, responsive to the address signals, for generating an output signal, said data input being coupled to receive the output signal.

10. A phase-lock oscillator according to claim 1 wherein said means for generating the first input signal of said tracking means comprises:
   (a) a first flip-flop having a clock input being coupled to said write clocking frequency signal generating means, a data input, and an output;
   (b) means, coupled to said write clocking frequency signal generating means, for generating an output signal straddling the expected time of arrival of the timing information, said data input of said first flip-flop receiving the output signal;
   (c) a second flip-flop having a data input coupled to said output of said first flip-flop, a clock input receiving the timing information, and an output, said second flip-flop being reset between occurrences of the timing information; and
   (d) a short delay line having an input coupled to said output of said second flip-flop and an output coupled to said error signal generating means.

11. A phase-lock oscillator according to claim 10 wherein said means for generating the second input signal of said tracking means comprises:
   (a) a third flip-flop having a data input, an output coupled to said error signal generating means, and a data input;
   (b) a logic gate having a first input coupled to said output of said second flip-flop, a second input, and an output coupled to said data input of said third flip-flop; and
   (c) means, responsive to the write clocking frequency signal, for generating an output signal at the expected time of arrival of the timing information, said second input of said logic gate receiving the output signal.

12. A phase-lock oscillator for use in conjunction with a rotatable surface having a stored encoding scheme including a plurality of pairs of first and second spaced synchronizing signals and position-indicating-information between each pair of first and second synchronizing signals, comprising:
   (a) means, responsive to a phase and frequency error signal, for generating a write clocking frequency signal;
   (b) means, responsive to first and second input signals, for generating the phase and frequency error signal;
   (c) digital means for acquiring initial synchronization including
      (i) means, responsive to the first and second synchronizing signals, for generating the first signal at a time corresponding to the start of the second synchronizing signal, and
      (ii) means, responsive to the write clocking frequency signal, for generating the second input signal;
   (d) digital means, responsive to a predetermined number of occurrences of the second synchronizing signal, for generating a signal indicating acquisition of synchronization;
   (e) digital means, responsive to the indicating signal, for tracking the acquired synchronization, including
      (i) means, responsive to the write clocking frequency signal and the second synchronizing signal occurring within a narrow interval straddling the expected time of arrival of the second synchronizing signal, for generating the first input signal in phase coherence with the second synchronizing signal, and
      (ii) means, responsive to the write clocking frequency signal and timing information, for generating the second input signal in phase coherence with the write clocking frequency signal and in frequency coherence with the second synchronizing signal; and
   (f) digital means, responsive to the write clocking frequency signal, for generating gating pulses to demodulate the position indicating information.

13. A phase-lock oscillator according to claim 12 wherein said means for generating the first input signal of said digital means for acquiring initial synchronization comprises:
   (a) a first flip-flop having a clock input, a reset input, and an output, and being clocked in response to the first synchronizing signals;
   (b) a first short delay line having an input coupled to said output of said first flip-flop and an output coupled to said reset input of said first flip-flop;
   (c) a second flip-flop having a clock input and being clocked in response to the second synchronizing signals, a data input coupled to said output of said first short delay line, a reset input, and an output; and
   (d) a second short delay line having an input coupled to said output of said second flip-flop and an output coupled to said phase and frequency error signal generating means and to said reset input of said second flip-flop.

14. A phase-lock oscillator according to claim 12 wherein said means for generating the second input signal of said digital means for acquiring initial synchronization comprises:
   (a) a flip-flop having a data input, an output coupled to said error signal generating means, and a clock input coupled to said write clocking frequency signal generating means;
   (b) counter means for dividing the write clocking frequency signal and for generating address signals identifying the state of said counter means; and
   (c) memory means, responsive to the address signals, for generating an output signal at about the expected time of arrival of the second synchronizing signals, said data being coupled to receive the output signal.

15. A phase-lock oscillator according to claim 12 wherein said digital means for generating a signal indicating acquisition of synchronization comprises means, responsive to a control signal, for counting the number of consecutive occurrences of second synchronizing signals within a narrow interval straddling the expected time of arrival of the second synchronizing signals and for generating the indicating signal in response to a preselected count to deactivate said digital means for acquiring initial synchronization and to activate said digital means for tracking.

16. A phase-lock oscillator according to claim 15 wherein said means for counting comprises:
   (a) a first flip-flop having a clock input being coupled to said write clocking fequency signal generating means, a data input, and an output;
   (b) means, coupled to said write clocking frequency signal generating means, for generating an output signal straddling the expected time of arrival of the second synchronizing signals, said data input of said first flip-flop receiving the output signal;
   (c) a second flip-flop having a data input coupled to said output of said first flip-flop, a clock input receiving the second synchronizing signals, and an output, said second flip-flop being reset between occurrences of the second synchronizing signals; and
   (d) a counter having a load input connected to said output of said second flip-flop and being incremented by one in response to a second synchronizing signal occurring within a narrow interval straddling the expected time of arrival of the second synchronizing signal.

17. A phase-lock oscillator according to claim 12 wherein said means for generating the first input signals of said digital tracking means comprises:
   (a) a first flip-flop having a clock input coupled to said write clocking frequency signal generating means, a data input, and an output;
   (b) means, coupled to said write clocking frequency signal generating means, for generating an output signal straddling the expected time of arrival of the second synchronizing signals, said data input of said first flip-flop receiving the output signal;
   (c) a second flip-flop having a data input coupled to said output of said first flip-flop, a clock input receiving the second synchronizing signals, and an output, said second flip-flop being reset between occurrences of the second synchronizing signals; and
   (d) a short delay line having an input coupled to said output of said second flip-flop and an output coupled to said phase and frequency error signal generating means.

18. A phase-lock oscillator according to claim 17 wherein said means for generating the second input signal of said digital tracking means comprises:
   (a) a third flip-flop having a data input, an output coupled to said phase and frequency error signal generating means, and a data input;
   (b) a logic gate having a first input coupled to said output of said second flip-flop, a second input, and an output coupled to said data input of said third flip-flop; and
   (c) means, responsive to the write clocking frequency signal, for generating an output signal at the expected time of arrival of the second synchronizing signal, said second input of said logic gate receiving the output signal.

19. A phase-lock oscillator according to claim 12 wherein said means for generating the phase and frequency error signal comprises a phase-frequency detector.

20. A phase-lock oscillator according to claim 12 further comprising means for detecting the absence of the first synchronizing signals.

21. A phase-lock oscillator for use in conjunction with a movable servo surface having a servo encoding scheme which includes timing information and position-indicating-information, comprising:
   (a) means, responsive to a control signal, for generating a first signal indicating initial acquisition of, or a second signal indicating loss of, synchronization with the timing information, including means for switching from the second indicating signal to the first indicating signal in response to a preselected number of occurrences of the timing information;
   (b) means for acquiring initial acquisition of synchronization in response to the second signal indicating loss of acquisition; and
   (c) means for tracking the acquired synchronization in response to the first signal indicating acquisition of synchronization.

22. A phase-lock oscillator according to claim 21 wherein said means for generating the first indicating signal or the second indicating signal comprises:
   (a) means for generating the second indicating signal in response to one state of the control signal;
   (b) means for counting the number of occurrences of the timing information in response to another state of the control signal and for generating an output signal in response to a preselected count; and
   (c) means for generating the first indicating signal in response to the output signal.

23. A phase-lock oscillator according to claim 22 wherein said means for counting comprises:
   (a) a counter; and
   (b) means for loading said counter.

24. A phase-lock oscillator according to claim 23 wherein the output signal is generated after a consecutive number of the occurrences of the timing information.

25. A phase-lock oscillator according to claim 22 further comprising means for switching from the first indicating signal to the second indicating signal in response to the absence of a preselected number of consecutive occurrences of the timing information.

* * * * *